United States Patent [19]

Schmitt

[11] Patent Number: 4,768,611
[45] Date of Patent: Sep. 6, 1988

[54] MOUNTING ARRANGEMENT FOR ENGINE DRIVE UNIT

[75] Inventor: Egon Schmitt, Nauheim, Fed. Rep. of Germany

[73] Assignee: General Motors Corporation, Detroit, Mich.

[21] Appl. No.: 17,958

[22] Filed: Feb. 24, 1987

[30] Foreign Application Priority Data

Mar. 20, 1986 [DE] Fed. Rep. of Germany ....... 3609411

[51] Int. Cl.[4] ............................................... B60K 5/12
[52] U.S. Cl. .................................... 180/300; 267/141.2
[58] Field of Search ................ 180/300, 312; 267/140, 267/140.5, 141.2, 141; 248/634

[56] References Cited

U.S. PATENT DOCUMENTS 4,294,732 10/1981 Ohyachi ............................... 248/634
4,392,640 7/1983 Kakimoto ......................... 267/141.2

FOREIGN PATENT DOCUMENTS 1580538 6/1966 Fed. Rep. of Germany .
3346708 7/1985 Fed. Rep. of Germany .
1155155 4/1958 France .................................. 267/141

Primary Examiner—John J. Love
Assistant Examiner—Karin L. Ferriter
Attorney, Agent, or Firm—R. L. Phillips

[57] ABSTRACT

A mounting arrangement for an engine drive unit, especially for use in motor vehicles, comprises an inner wedge-shaped metal member and an outer frame-like metal member which is symmetrically spaced apart from the wedge-shaped metal member, with separate elastomeric elements arranged between the inner and outer metal members. The elastomeric elements are offset from each other with respect to their effective axes to increase local damping of the vibrations in the low-frequency range.

6 Claims, 3 Drawing Sheets

| ELASTOMER GRADE | DYNAMIC SPRING RATE K (N/mm) | INCREASE IN LOSS ANGLE CAUSED BY OFFSET AXES | FREQUENCY f AT MAXIMUM LOSS ANGLE (Hz) |
|---|---|---|---|
| I | 98 | 3° ⟶ 6° | 12 |
| II | 130 | 4° ⟶ 7° | 13 |
| III | 158 | 4° ⟶ 7° | 14 |
| IV | 174 | 6.5° ⟶ 9° | 17 |
| V | 217 | 5° ⟶ 8° | 17.5 |
| VI | 249 | 8° ⟶ 11° | 17 |
| VII | 366 | 6.5° ⟶ 11° | 27 |
*Fig. 3*
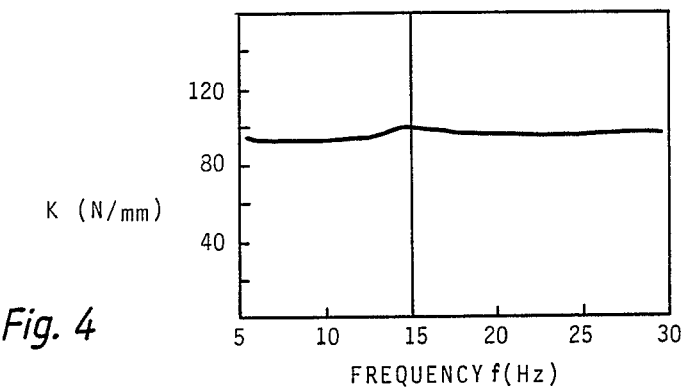
*Fig. 4*
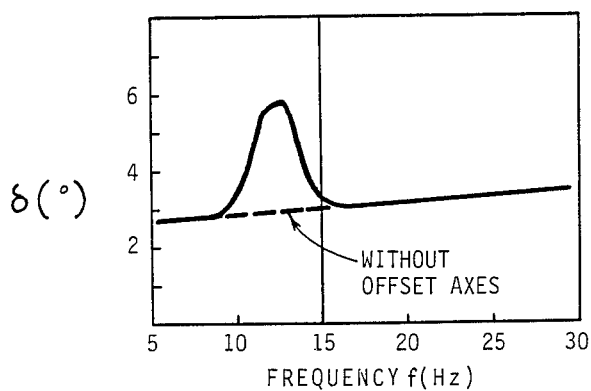
*Fig. 5*

MOUNTING ARRANGEMENT FOR ENGINE DRIVE UNIT

TECHNICAL FIELD

This invention relates to a mounting arrangement for an engine drive unit, especially for motor vehicles, and more particularly to a mounting arrangement comprised of an inner wedge-shaped metal member and an outer frame-like metal member which is symmetrically spaced apart from the inner metal member, with the inner and the outer metal members having elastomeric elements mounted therebetween.

BACKGROUND OF THE INVENTION

A mounting arrangement of this type is disclosed in U.S. Pat. No. 4,392,640. According to this patent, the elastomeric elements between the wedge-shaped metal member and the frame-like metal member are arranged in such a manner that their effective working axes coincide.

Experience has shown that when traveling on certain types of road surfaces, motor vehicles (both of the front and rear wheel drive type) if equipped with the type of engine mounts disclosed in the above-mentioned patent can develop vibrations that are disconcerting to the vehicle occupants. Such vibrations are encountered primarily when the vehicle is traveling on a road surface having a harmonic profile, as in the case of concrete slabs with cross joints. Under these conditions, the drive unit mounted on the elastomeric elements is induced to harmonic oscillations in the frequency range between 8 and 15 Hz. Based on the mass and rigidity characteristics, the inherent frequency of a motor vehicle drive unit lies in this same range. If this inherent frequency range of the drive unit happens to coincide with the maximum of the road surface excitation, excessive vertical engine movements or accelerations encounter in this speed range. These accelerations are transmitted to the vehicle body and can have an adverse effect on the riding comfort.

One approach to eliminating vertical engine vibrations of the type described above is to use relatively hard engine mounts, i.e. elastomeric elements that exhibit a high degree of rigidity or stifffness. This will shorten the vibratory travel distances of the drive unit and, as a result, will shift the resonance frequency of the engine mount to higher frequencies and out of the maximum of the road excitations. Another relatively simple approach to rectifying the problem is the use of engine mounts with damping means at the elastomeric elements. However, since the elastomeric elements are also expected to isolate the second order ignition frequencies generated by the engine which, in the case of a four-cylinder engine running at 1000 to 6000 rpm, are in the range of 33 to 200 Hz, these chosen palliatives do not constitute an adequate solution, because to isolate second order ignition frequencies requires the use of soft elastomeric elements that have a low dynamic spring rate. The use of elements with damping characteristics also causes a marked increase in the dynamic spring rate.

Through tests one can demonstrate good acoustic results by using an elastomer which may be described by the following characteristics:
  static inward deflection $\eta m = 3.05$ mm
  at a static load $F_m = 600$ N (Newton),
  dynamic spring rate $K = 460$ N/mm
  at an amplitude of the dynamic inward deflection
  $l_o = \pm 0.5$ mm
  and a loss angle $\delta = 3.4°$
  at a frequency of 15 Hz.

However, a substantial deterioration of the acoustic results will already occur by using an elastomer having characteristics as defined as follows:
  static inward deflection $\eta m = 2.9$ mm
  at the same static load $F_m$,
  dynamic spring rate $K = 494$ N/mm
  at the same amplitude of dynamic inward deflection $l_o$,
  loss angle $\delta = 7°$
  at the same frequency.

It is apparent from these two test results that the use of the known high damping type elastomeric grades in the drive unit mounts leads to a problematic acoustic increase of the dynamic soring rate K while, at the same time, an improvement can be realized in the low-frequency vibratory problem area. The increase of the loss angle $\delta$ by 108% corresponds to an increase of the dynamic spring rate of 20%.

SUMMARY OF THE INVENTION

It is an object of the present invention to provide a mounting arrangement of the type described above wherein a novel geometric configuration of the engine mount renders it possible to achieve a local damping increase in the low frequency range.

This object is accomplished by simply offsetting the effective working axes of the elastomeric elements relative to each other.

The above-described arrangement of the elastomeric elements it was found induces rotary oscillations in these elements, especially in the frequency range between 8 to 30 Hz. These rotary oscillations result in improved damping characteristics in a particular frequency range, a feature which is desirable to counteract disturbances that may be generated in the vehicle body. The use of elastomeric elements with minimum damping does not cause acoustic disadvantages, and the use of low-damping elastomeric elements does not affect the acoustically relevant dynamic spring rate K. Selection of the elastomer quality, offset of axes and other geometric criteria thus enables control of the frequency position of the rise in damping as well as the magnitude of the rise in damping.

DESCRIPTION OF THE PREFERRED EMBODIMENT

These and other objects, advantages and characteristic features of the invention will become more apparent from the following description of the preferred embodiment in conjunction with the attached drawings.

The mounting arrangement according to the invention is illustrated in FIG. 1 by way of a front view and in FIG. 2 by way of a plan view.

FIG. 3 is a table of various elastomer grades that were tested in the mount in FIGS. 1 and 2.

FIGS. 4–7 are graphs of the test results relating thereto as described in detail later.

The engine drive unit mount is comprised of an inner, wedge-shaped metal member 1 which is adapted for connection to the engine, and an outer arcuate, generally U-shaped metal member 2 which is adapted for connection to the vehicle body. Between the inner metal member 1 and the outer metal member 2 there are arranged elastomeric elements 3, 4 which are bonded to the metal members 1, 2 in a manner generally known in the art.

Figure 2:
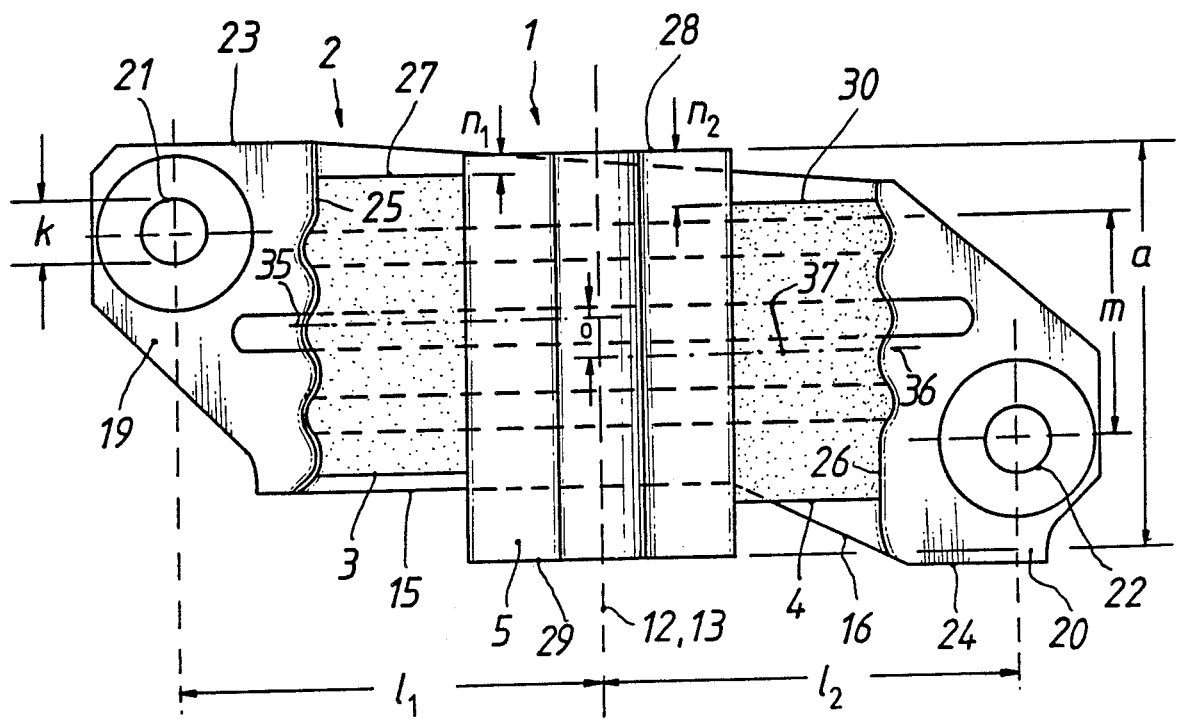

The wedge-shaped metal member is an oblong body, and its length dimension (a) equal 68 mm. Its cross section has a triangular configuration, and its outer surfaces 5, 6 and 7 form an angle α of 60°, with the cross-wise length (b) of the leg amounting to 45 mm. The metal member 1 is provided with two longitudinally extending recesses 8, 9 and two longitudinally extending through-bores 10, 11. Bore 10, with a diameter (c) of 10 mm is arranged in the region between the vertex formed by the outer surfaces 6, 7 of the metal member 1 and extends parallel to a central longitudinal axis 12 thereof, and the other bore 11 which has a diameter (d) of 10 mm, is arranged midway of the outer surface 5 disposed opposite the vertex, with said outer surface 5 being slightly arched outwardly, and the radius (e) of the arch corresponding to 8 mm. Thus, the metal member 1 is symmetrical with respect to the bisecting line 13 extending through the axes of the bores 10, 11 and the central axis 12. The bores 10, 11 serve to accommodate threaded bolts (not shown) which are used to fasten the engine, directly or indirectly, to the metal member 1. The recesses 8, 9 extend parallel to the bores 10, 11. They are arranged symmetrically with respect to the bisecting line 13 and have a kidney-shaped cross section. The remaining wall thickness (f) between recesses 8 and 9, and the outer surfaces 5, 6 and 7, respectively, is 4 mm. The outer metal member 2 is comprised of a web portion 14, the length (g) of said web portion amounting, when viewed in cross section, to 48 mm. Furthermore, the outer member 2 has leg portions 15, 16, which extend from either end of the web portion 14. The leg portions 15, 16, whose length (h) equals 50 mm, form an angle β of 60° with the web portions at both ends thereof. The outer metal element 2 is provided with second leg portions 17, 18 which extend from the ends of the first leg portions 15, 16 opposite the web portion 14. These second leg portions 17, 18 which extend parallel to each other, are of different length dimensions, with length $i_1$ being 25 mm and length $i_2$ being 40 mm, respectively and form an angle γ of 30° with the first leg portions 15, 16. The web portion 14 as well as the leg portions 15, 16, 17, 18 are undulated when viewed in cross section. Third leg portions 19, 20, having a length (j) of 27 mm, are provided and extend from the ends of the second leg portions 17, 18. The third leg portions 19, 20 extend in a direction away from each other and form a right angle with the second leg portions 17, 18. Furthermore, each third leg portion 19, 20 is provided with a bore 21, 22 and the diameter (k) of each of these bores is 11 mm. The bores 21, 22 serve to accommodate threaded bolts (not shown) which are used to fasten the metal member 2 directly to the vehicle body. The distance ($l_1$) between the center of the bore 21 and the line 13 bisecting the web portion 14 as well as the first and second leg portions 15 to 18 is 70 mm, and the distance ($l_2$) between the center of the bore 22 and the same bisecting line 13 is 71 mm. The respective centers of bores 21, 22 are offset from each other in the direction of the longitudinal axis 12 of the wedge-shaped member 1 by the dimension (m) which corresponds to 37 mm. As apparent from FIG. 2, when viewed from the top, the third leg portions 19, 20 have a cross section that corresponds to a right-angle triangle, with the leg 23 extending parallel to leg 24, and leg 24 extending parallel to leg 26, and with leg 23 being disposed at the one end and leg 24 at the other end of member 2. The legs 25 and 26 are respectively joined with the second leg portions 17 and 18, and the bores 21, 22 are respectively arranged in that part of the leg portions 19 and 20 in which the leg portions 23 and 25 are forming respective angles with the leg portions 24 and 26.

The pair of elastomeric elements 3 and 4 joined with the metal members 1 and 2 have a rectangular block shape with identical dimensions 50×31×27 mm. The opposite surfaces defined by the dimensions 50×31 are the ones which are bonded to the metal members. The elastomeric members 3 and 4 are respectively fastened to the outer surfaces 6 and 7 of the metal member 1, the arrangement being such that the end face 27 of the elastomeric member 3 is positioned parallel to the end face 28 of the metal member 1, but is offset relative to said end face 28 in the direction of the opposite end face 29 of the metal member 1 by the dimension ($n_1$) which corresponds to 4 mm. The same holds true for the end face 30 of the elastomeric element 4, except that this end face is offset by the dimension $n_2$ which amounts to 9 mm, so that the effective working axes of the two elastomeric elements 3, 4 are offset from each other by the dimension (o) which corresponds to 5 mm. The reference numerals 35 and 36 in FIG. 2 denote the respective effective working axes of the elastomeric elements 3 and 4, and reference numeral 37 denotes a transverse center plane of the metal member 1.

Figure 1:
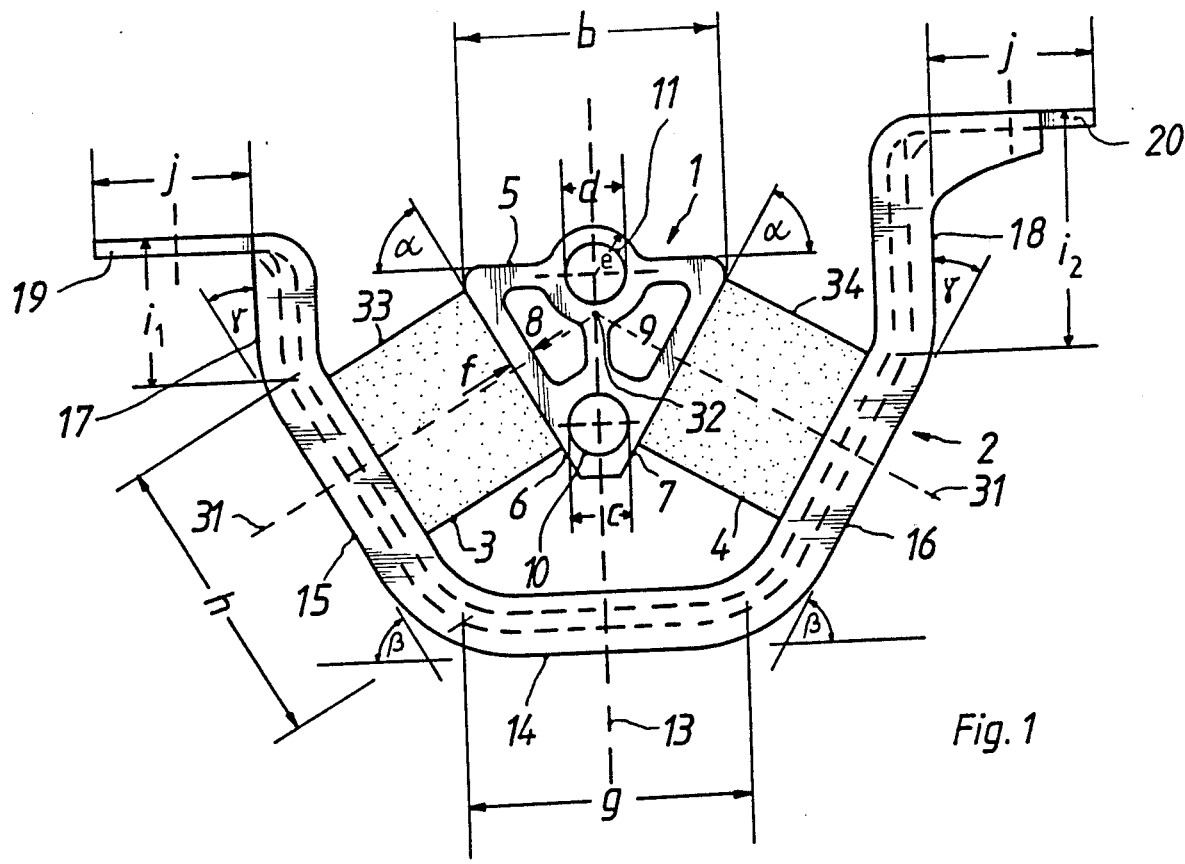

The elastomeric elements 3, 4 are arranged, with respect to the metal member 1, in such a manner that the respective bisecting lines 31 of the elastomeric members 3 and 4 intersect the bisecting line 13 of the metal member 1 at a point 32 which would coincide with a point that would be located if one were to draw a straight line at an angle of 20° with respect to the outer surface 5 according to FIG. 1 through the edge formed by the outer surfaces 5, 6 and 5, 7, respectively.

Furthermore, the elastomeric elements 3, 4 are arranged with respect to the metal member 2, in such a manner that the web portion 14 and the first and second leg portions 15 to 18 as well as the elastomeric elements 3, 4 and the metal member 1 are positioned symmetrically to the bisecting line 13. The planes 33 and 34 of the respective elastomeric elements 3 and 4 intersect the metal member 2 in the region where the first leg portions 15, 16 are joined to the second leg portions 17, 18.

In the following, the tests conducted with the subject engine mounting arrangement are described in detail, but to gain a better understanding, a few fundamental aspects shall be discussed first.

The tests are in accordance with the procedures outlined in the German standards DIN 53 515. This standard relates to the testing of finished elastomeric components used in motor vehicles under forced vibration conditions outside the resonance frequencies within the temperature range of minus 30° C. to plus 150° C. The purpose of the tests is to find the dynamic spring rate K and the loss angle δ. These values characterize the behavior of finished elastomeric vibration damping elements when subjected to dynamic loads.

The terms used in the tests described below may be defined as follows:

Static load $F_m$ is the constant force used to put the elastomeric test specimen under load in a given direction and constitutes the mean load of the finished elastomeric part.

Static inward deflection $l_m$ is the deflection travel of the finished elastomeric part under static load $F_m$ and is measured in the direction of the application of this load.

Amplitude of dynamic inward deflection $l_o$ is the maximum value of the vibration $l_o \times \sin \omega t$ is superposed upon the static inward deflection $l_m$ in the direction of the application of the load $F_m$. In the following it will be termed simply the amplitude $l_o$.

Load amplitude $F_a$ is the maximum value of the load vibration which is superposed upon the static load $F_m$ due to the vibration $l_o \times \sin \omega t$. Its direction of application lies also in the static load $F_m$.

Inward deflection l is the instantaneous value of the spring travel of the finished elastomeric element, which accrues from the interrelationship $l_m$ and $l_o \times \sin \omega t$ $$l = l_m + l_o \times \sin \omega t.$$

Load F is the value resulting from the inward deflection 1 and is given by $$F = F_m + F_a \times \sin(\omega t + \delta).$$

Frequency f is the frequency of the forced, sinusoidal vibration. Angular frequency $$\omega = 2 \times \pi \times f.$$

Loss angle $\delta$ indicates how far the load F is ahead of the inward deflection. It is a value for the damping capacity of finished elastomeric elements as related to mechanical vibrations.

Dynamic spring rate K is a value for the stiffness of finished elastomeric elements under dynamic load.

Seven wedge-shaped engine mounts with different characteristics, i.e., elastomeric qualities were subjected to tests and are listed in FIG. 3. The test results showed that a rise in the loss angle is achievable only by providing a mounting arrangement in which the effective working axes 35 and 36 of the elastomeric elements 3, 4 are offset.

As already indicated in the specifications, the axes of the elastomeric elements 3, 4 are offset from each other by a distance of 5 mm. The tests were based on a static load $F_m = 600N$ and an amplitude of the dynamic inward deflection $l_o = \pm 0.5$ mm.

A first test with the low-damping elastomer grade I disclosed the relationship between the frequency f and the dynamic spring rate K, as well as between the frequency f and the loss angle $\delta$, as illustrated in FIGS. 4 and 5. Referring to FIG. 5, without the offset working axes the loss angle $\delta$ in a frequency range of 5–30 Hz was found to rise only insignificantly along the dashed line portion at a steady rate from 2.8° to 3.2°, whereas in the case of the offset axes mounting arrangement one will note that in the range of up to 9 Hz and from 17 Hz upward this curve is identical with the curve for a mounting arrangement without offset axes, but in the range from 9 to 17 Hz the loss angle $\delta$ suddenly jumps to a value of about 6° at a frequency of about 12 Hz. At the same frequency of 12 Hz, the loss angle value with a mounting arrangement without offset axis amounts to only about 3°, and therefore the rise in the loss angle available with the novel offset axes arrangement amounts to 3°. FIG. 4 illustrates that, in the case of the offset axes mounting arrangement, the behavior of the dynamic spring rate K is relatively constant over the same frequency range. There is only a modest rise observable at about 12 Hz, and the value is about 98 N/mm. The value of the dynamic spring rate K remains essentially unchanged, both in the offset and non-offset axes arrangement. The procedure for establishing $K = f(f)$ and $\delta = f(f)$ for the elastomer grades II to VII was the same as that outlined in the foregoing, and the results were in close agreement with those that were established for grade I. FIG. 3 lists the critical relationships and for the sake of completeness, also contains the values for grade 1.

Figure 6:
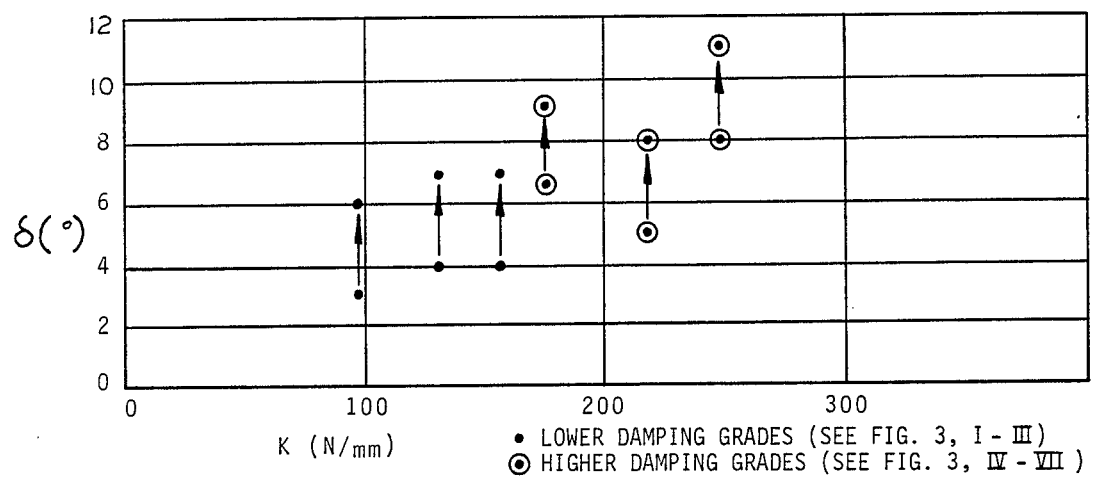

FIG. 6 illustrates the interdependency of the loss angle $\delta$ and the dynamic spring rate K. It is apparent from this graph that the rise in loss angle manifests itself both in low and high-damping elastomer grades.

Figure 7:
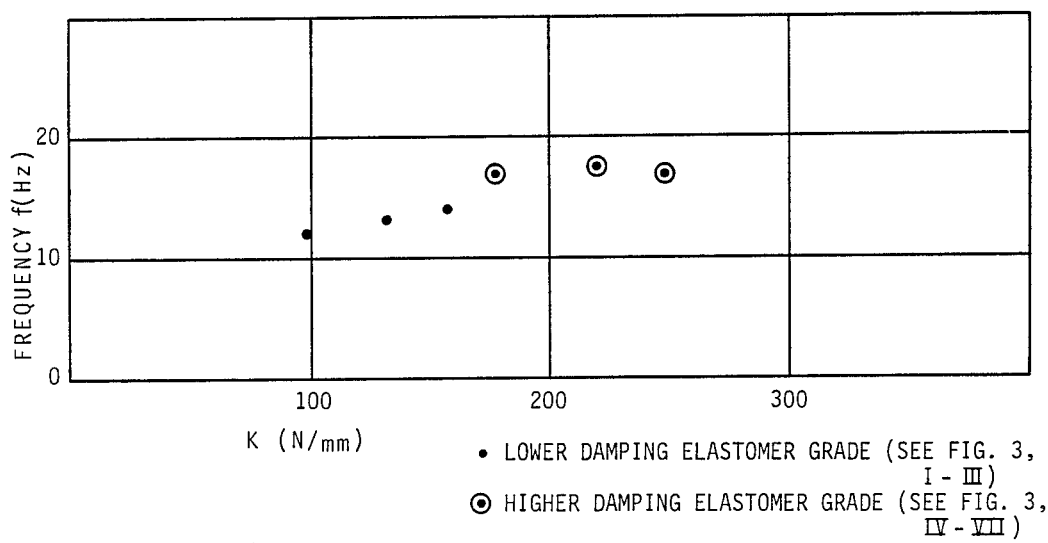

FIG. 7 illustrates to what extent the frequency position is controllable by the elastomer grade, which is represented by the spring rate K.

The above described preferred embodiments are illustrative of the invention which may be modified within the scope of the appended claims.

The embodiments of the invention in which an exclusive property or privilege is claimed are defined as follows:

1. A mounting arrangement for an engine drive unit, particularly in motor vehicles, with an inner wedge-shaped portion serving as one of two mounting members, and an outer frame-like portion serving as the other mounting member and arranged symmetrically at a distance from the wedge-shaped metal portion with separate elastomeric elements arranged between and bonded to the inner and outer portions, characterized in that the elastomeric elements are arranged relative to each other so as to have working axes substantially offset from each other that induce rotary oscillations in said elements on relative vibratory motion of said inner and outer portions.

2. A mounting arrangement according to claim 1, further characterized in that the elastomeric elements are identical, and the surfaces of the inner and outer portions which receive the elastomeric elements extend at an acute angle to a plane longitudinally bisecting the mounting arrangement.

3. A mounting arrangement according to claim 1, further characterized in that the length of the inner portion is greater than the length of the elastomeric element by two to six times the offset of the working axes.

4. A mounting arrangement according to claim 1, further characterized in that at least one of the working axes of the elastomeric elements is arranged at a distance from a plane extending transversely and centrally of the mounting arrangement.

5. A mounting arrangement according to claim 3, further characterized in that the outer portion is provided with at least two connecting means for connecting same to a vehicle member, the connecting means being arranged at distances from the opposite sides of the transverse center plane.

6. A mounting arrangement according to claim 5, further characterized in that the elastomeric elements have a dynamic spring constant of 90 to 370 N/mm, under a static load of 600 N and an amplitude of dynamic spring deflection of 0.5 mm.

* * * * *